United States Patent [19]

Mealey

[11] Patent Number: 5,057,344
[45] Date of Patent: Oct. 15, 1991

[54] FRAMED BOUQUET

[76] Inventor: Margaret P. Mealey, 9127 La Larga Vista, Spring Valley, Calif. 92077

[21] Appl. No.: 478,968

[22] Filed: Feb. 12, 1990

[51] Int. Cl.$^5$ ............................ B44C 5/04; G02B 5/08
[52] U.S. Cl. ...................................... 428/13; 428/26; 428/912.2; 428/913.3
[58] Field of Search .................. 206/423; 428/13, 14, 428/912.2, 913.3, 26; 47/41.12

[56] References Cited

U.S. PATENT DOCUMENTS

| D. 111,774 | 10/1938 | Nudell | D11/139 |
|---|---|---|---|
| D. 264,452 | 5/1982 | Crawford | D11/139 |
| 1,143,601 | 6/1915 | Smith | 428/14 |
| 1,731,089 | 10/1929 | Adams | 428/26 X |
| 1,885,345 | 11/1932 | Guthrie | 428/13 X |
| 2,312,007 | 2/1943 | Thrasher | 47/41.12 X |
| 2,354,622 | 7/1944 | Swartz | 428/913.3 X |
| 2,774,187 | 12/1956 | Smithers | 47/41.12 |
| 3,455,045 | 7/1969 | Thomas | 428/913.3 X |
| 4,212,133 | 7/1980 | Lufkin | 428/14 X |
| 4,353,327 | 10/1982 | Shroyer | 428/13 X |
| 4,356,650 | 11/1982 | Antonczyk et al. | 428/13 X |

FOREIGN PATENT DOCUMENTS 251308   5/1964   Australia ................. 428/912.2

Primary Examiner—Henry F. Epstein
Attorney, Agent, or Firm—Brown, Martin Haller & McClain

[57] ABSTRACT

A decorative plaque formed form a substantially planar backing member having front and rear surfaces and side edges. A flexible translucent membrane overlays the front surface of the backing member. At least one decorative object is disposed between the membrane and the backing member front surface with the decorative object spacing the membrane from the backing member front surface. The decorative plaque may further comprise a frame surrounding the backing member at the side edges thereof and overlaying the backing member front surface and membrane adjacent the backing member side edges.

6 Claims, 1 Drawing Sheet

FRAMED BOUQUET

BACKGROUND OF THE INVENTION

I. Field of the Invention

The present invention relates to decorative plaque and panels. More specifically, the present invention relates to a novel and improved ornamental plaque for displaying decorative objects and method for forming same.

II. Description of Related Art

There are well known various techniques used in mounting decorative objects, such as floral arrangements, in a plaque for display. One such technique involves the sandwiching of the decorative objects between substantially planar plates, one of which is transparent for viewing the decorative objects. Typically a frame or some type of border is used to maintain the position relationship of the plates and decorative objects. In many applications the plates compress the decorative objects to a minimal thickness.

Other structures for displaying decorative elements involve the mounting of the decorative elements upon a backing member. A hemispherical dome formed from a rigid transparent material is positioned over the backing member with the decorative elements contained therein. Typically the relationship between the dome and backing member is maintained by a frame which borders the structure.

The just described techniques in forming ornamental plaques for displaying decorative objects can damage the visual impact intended of the display and objects. Such damage can occur when the objects are compressed between the planar backing member and transparent front plate. The spacing of the transparent front panel from the backing member and objects, so as to provide an area in which the decorative element is uncompressed, is possible. However, the use of the spaced apart front panel and backing member can be quite aesthetically unappealing. Similarly, the dome type plaque may also be of an appearance that is unappealing in many applications.

It is therefore an object of the present invention to provide a decorative plaque or panel which provides a unique presentation of a decorative object such as a silk floral arrangement.

It is yet another object of the present invention to provide a display for decorative objects in which a backing member and outer covering provide a unique visual experience for decorative objects positioned therebetween.

SUMMARY OF THE INVENTION

The present invention is directed towards a novel and improved decorative plaque which provides an aesthetically appealing presentation of decorative objects. The present invention comprises a backing member having a front surface upon which a decorative object, such as a silk flower arrangement, is positioned. A flexible translucent sheet is positioned to overlay the decorative object which has three dimensional characteristics. The outermost points of the decorative object from the backing member are in intimate contact with the sheet such that the decorative object defines the contour of the sheet. The sheet is typically folded over the edges of the backing member and attached to the backing member rear surface. The sheet may be of a single color or multicolored and formed from a sheer fabric. The backing member may be a mirror. The backing member as a mirror is positioned so as to reflect the image of the decorative object forward through the sheet. The particular arrangement thus provides a "holographic" appearance when viewed by the observer.

BRIEF DESCRIPTION OF THE DRAWINGS

The features, objects and advantages of the present invention will become fully apparent from the detailed description set forth below when taken in conjunction with the drawings in which like reference characters identify correspondingly throughout and wherein.

DESCRIPTION OF THE PREFERRED EMBODIMENT

Figure 1:
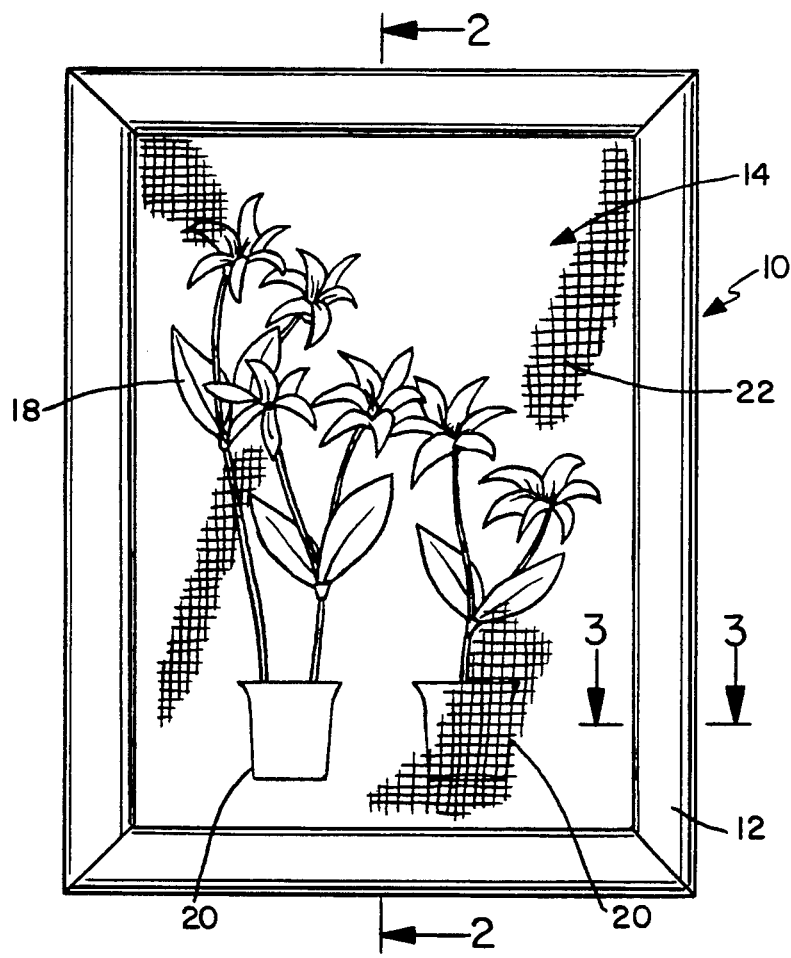
FIG. 1 is a front view of a typical frame mounted decorative plaque of the present invention.

Turning now to FIG. 1, illustrated therein is a front view of decorative plaque 10 of the present invention. Plaque 10 is comprised of a frame 12 which borders a central display portion 14. Display portion 14 includes a backing member 16 (FIGS. 2 and 3) upon which is mounted a decorative object such as the silk flower arrangements 18 and accompanying vases 20. Overlaying and conforming to the contour of the decorative elements is a flexible translucent sheet or membrane 22.

Figure 2:
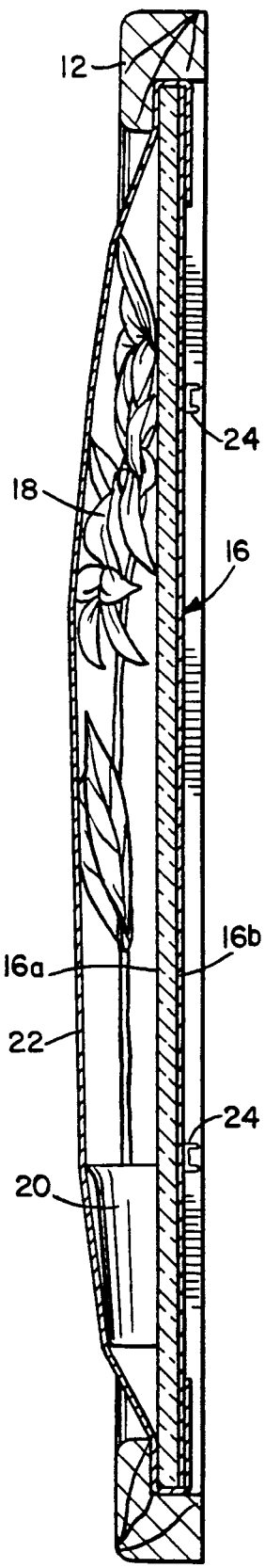
FIG. 2 is an enlarged sectional view taken on line 2—2 of FIG. 1.

FIG. 2 illustrates in an enlarged sectional view taken along line 2—2 of FIG. 1 the construction of plaque 10. As illustrated in FIG. 2, backing member 16 is typically of planar construction and may be a matte board of the type well known in the art or any other type of backing material, preferably a mirror.

Backing member 16 when configured as a mirror has a glass plate 16a with a reflective coating 16b formed upon a rear surface thereof. Positioned adjacent plate 16a at a front surface, opposite the surface upon which reflective coating 16b is formed, is the decorative object. The decorative elements are preferably attached to the backing member 16 and typically by an adhesive material or other well known means.

The decorative object is comprised of silk flower arrangements 18 and accompanying vases 20. Arrangements 18 and vases 20 are preferably three dimensional in nature so as to protrude away from glass plate 16a. Sheet 22 is positioned over the decorative object and contacts the outermost points thereof. For example, in FIG. 2 sheet 22 contacts the outermost leaves and pedals of the flowers of arrangement 18 and vase 20. Although the decorative object illustrated in the drawings is an exemplary silk flower arrangement, it is envisioned that other types of objects of a three dimensional nature may be used. Sheet 22, which overlays the decorative objects, contacts the front surface of plate 16a adjacent the side edges thereof.

Frame 12 is utilized to assist in maintaining the position of sheet 22 when display portion 14 is mounted within frame 12. Display portion 14 is typically retained within frame 12 by retaining clips 24 which are well known in the art.

Sheet 22 is preferably of a flexible translucent material that is a sheer gauze or fabric such as a voile or preferably silk organza. Sheet 22 may be of a single or multiple colors. The sheerness of sheet 22 permits light and the image of the decorative object to be perceived by the viewer. The utilization of a mirror as backing member 16 permits a unique visual experience in viewing of the decorative elements. With backing member 16 as a mirror, one is able to view the reverse portion of the decorative object. The additional image enhances the appearance of the decorative object. As perceived by the viewer, the direct and reflected imaged give the illusion of multiple decorative elements, more than actually exist.

Figure 3:
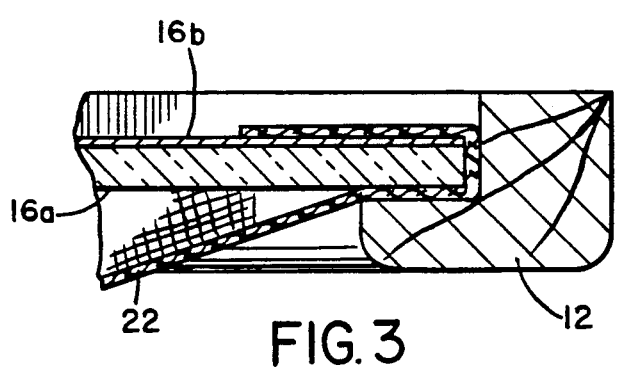
FIG. 3 is an enlarged partial sectional view taken on line 3—3 of FIG. 1.

FIG. 3 illustrates further details of plaque 10 in an enlarged partial sectional view taken on line 3—3 of FIG. 1. In FIG. 3, sheet 22 overlaps the edges of backing member 16 and the rear surface thereof so as to overlay reflective coating 16b. Sheet. 22 is typically attached by an adhesive to backing member 16 at the side edges thereof and/or the rear surface of backing member 16 upon reflective coating 16b. In the alternative the sheet 22 may be attached to backing member 16 by means such as tape. When decorative portion 14 is mounted within frame 12, frame 12 also serves to partially contact membrane 22 at the front surface of backing member 16 facing the decorative object. Frame 12 may be displayed on a stand, alone, or mounted upon a wall or other surface by conventional means that are well known in the frame art.

In the preferred embodiment, the decorative object is illustrated as a silk flower arrangement mounted in vases. However, it should be understood that any other type of three-dimensional objects may be utilized to provide the same visual effect when used in combination with the backing member and the overlaying translucent sheet. The shape and frame may be of various sizes and shape as desired by the creator. It is therefore envisioned that any variations to the present invention may be readily made that fall within the scope of the teachings thereof. It is an important element of the invention that the decorative elements be provided with a three dimensional aspect so as to provide spacing from the backing member 16 for sheet 22. When utilizing a mirror as the backing member the visual experience is substantially enhanced by altering the normal viewing perspective of the decorative object.

The previous description of the preferred embodiment is provided to enable any person skilled in the art to make or use the present invention. Various modifications to this embodiment will be readily apparent to those skilled in the art, and the generic principles defined herein may be applied to other embodiments without the use of the inventive faculty. Thus the present invention is not intended to be limited to the embodiment shown herein, but is to be accorded the widest scope consistent with the principles and novel features disclosed herein.

I claim:

1. A decorative plaque for displaying ornamental objects in an upright orientation, comprising:
   a planar backing member having a flat front surface;
   a three dimensional ornamental object mounted on the front surface of the backing member and projecting outwardly from the front surface by a varying amount over the area of the object to form a variable depth outer contour;
   first securing means for securing the ornamental object to the front surface of the backing member at a selected position;
   a flexible translucent cover sheet of larger area than the backing member covering the ornamental object and front surface of the backing member and conforming to the variable depth outer contour of the ornamental object; and
   second securing means for securing the outer periphery of the translucent sheet to the outer periphery of the backing member with the sheet contacting but not compressing the ornamental object to maintain its three dimensional characteristics, and the sheet spaced away from the backing member by a distance which varies across its area by the ornamental object.

2. The plaque as claimed in claim 1, further including a frame extending around the outer periphery of the backing member with the outer periphery of the cover member sandwiched between the frame and backing member; and
   retaining means for securing the frame to the backing member.

3. The plaque as claimed in claim 1, wherein the cover sheet is of larger area than the backing member and overlaps the outer edges of the backing member around its periphery, the overlapping portions of the cover sheet being folded over the outer edges and secured against the rear surface of the backing member.

4. The plaque as claimed in claim 1, wherein said backing member comprises a reflective surface for reflecting the image of said decorative object.

5. The plaque as claimed in claim 1, wherein said decorative object comprises a silk flower arrangement.

6. A decorative plaque for displaying ornamental objects, comprising:
   a planar backing member having a flat front surface, outer side edges extending around the periphery of the member, and a flat rear surface;
   a flexible translucent cover sheet extending over the front surface of the backing member, the cover sheet being of shape matching that of the backing member but of larger dimensions, the outer peripheral edge of the cover sheet extending over the side edges of the backing member and being secured to the rear surface of the backing member;
   at least one three dimensional decorative object of varying depth located between the front surface of the backing member and the cover sheet with the cover sheet contacting but not compressing outer portions of the decorative object and the decorative object spacing the cover sheet from the backing member by a distance which varies across the area of the cover sheet;
   securing means for securing the decorative object at a selected location to the front surface of the backing member;
   a frame extending around the outer periphery of the backing member and overlying portions of the cover sheet and front surface of the backing member adjacent the side edges of the backing member with the underlying portions of the cover sheet sandwiched between the frame and backing member; and
   retaining means for attaching the frame to the backing member.

* * * * *